J. B. KURTZ.
Horse Hay Fork.
No. 83,175.
Patented Oct. 20, 1868.
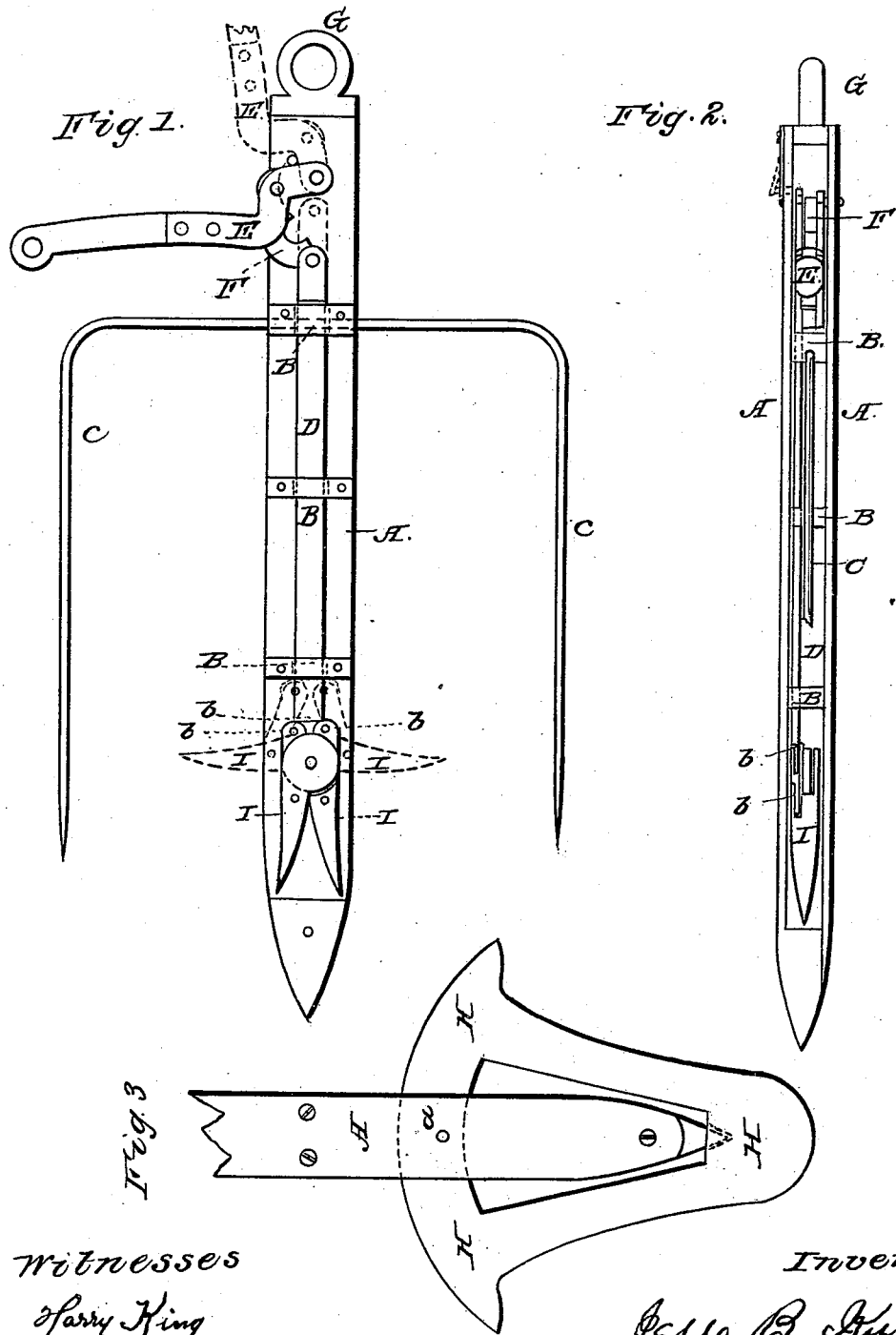

JESSE B. KURTZ, OF DAVISBURG, PENNSYLVANIA.

Letters Patent No. 83,175, dated October 20, 1868.

IMPROVEMENT IN HORSE HAY-FORKS.

The Schedule referred to in these Letters Patent and making part of the same.

*To all whom it may concern:*

Be it known that I, JESSE B. KURTZ, of Davisburg, in the county of York, and in the State of Pennsylvania, have invented certain new and useful Improvements in Combined Hay-Fork and Knife; and do hereby declare that the following is a full, clear, and exact description thereof, reference being had to the accompanying drawings, and to the letters of reference marked thereon.

The nature of my invention consists in the construction and general arrangement of a combined hay-fork and knife, which will be hereinafter more fully set forth.

In order to enable others skilled in the art to make and use the same, I will now proceed to describe its construction and operation, referring to the annexed drawings, which form a part of this specification, and in which—

Figure 1 is a front view in section of the hay-fork;

Figure 2, a side view of the same; and

Figure 3 is a front view of the lower portion of the same when used as a knife.

A represents the centre tine, formed of two pieces, so as to leave a space between them, but with the point solid, as more clearly shown in fig. 2.

The two pieces are fastened together by means of screws passing through or into blocks B B, placed across the tine in the space between the two pieces. From one of these blocks B the side tines C C extend.

Inside of the tine A, and at a suitable height above the point, are pivoted two points I I, by means of a bolt or pin, *a*, passing through the upper rounded end of the same and the tine A.

A movable bar, D, which runs up and down in slots on the blocks B B, and is provided at its lower end with a head, *b*, is connected with the points I I by means of arms *c c*, pivoted to the said points and to the head *b*, in such a manner that when the bar D is moved up, it carries the points I I outward in a horizontal position, one on each side of the centre tine A, and when the bar is moved downward, the points are let down into the said tine, so as not to interfere or prevent the tine from passing down into the hay.

Near the upper end of the tine A, the bar D is connected with a bent lever, E, pivoted in the tine by means of a crooked arm, F, in such a manner that when raising the lever E up, the arm D is raised and points thrown out, and when pressing the lever down, the arm D is lowered, and the points closed inside of the tine.

To the upper end of the tine A is secured a ring, G, to which the rope for hoisting the hay is attached.

When desired to use the hay-fork as a knife to cut the hay with, remove the upper part of the tine A, that is the upper piece forming the tine, and remove the points I I. The knife H, constructed as shown in fig. 3, is then placed between the parts of the tine A, the bolt *a* passing through the upper portion thereof, the point of the tine being inserted into a slot or groove in the upper portion of the knife-blade or point, thus firmly securing the knife, so that it can be used for the purpose designed.

Having thus fully described my invention,

What I claim as new, and desire to secure by Letters Patent, is—

The centre tine A, provided with side tines C C, in combination with the knife H, constructed substantially as shown and described, and operating as and for the purposes herein set forth.

In testimony that I claim the foregoing, I have hereunto set my hand, this 4th day of August, 1868.

JESSE B. KURTZ.

Witnesses:
A. N. MARR,
LEOPOLD EVERT.